INVENTORS
BRIAN BOWMAN DALY
ALEC GERARD JAMES BAKER
JOSEPH PERCIVAL ANDERSON
BY Kirchstein, Kirchstein & Ottinger
ATTORNEYS

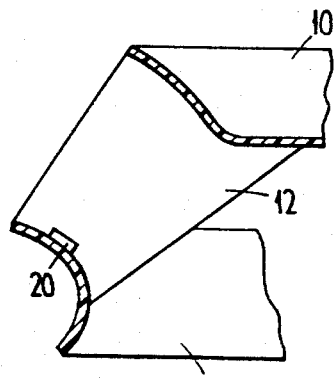
Fig. 8
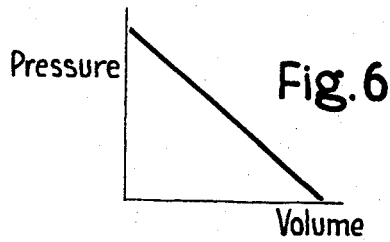
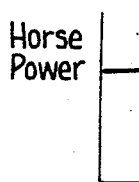
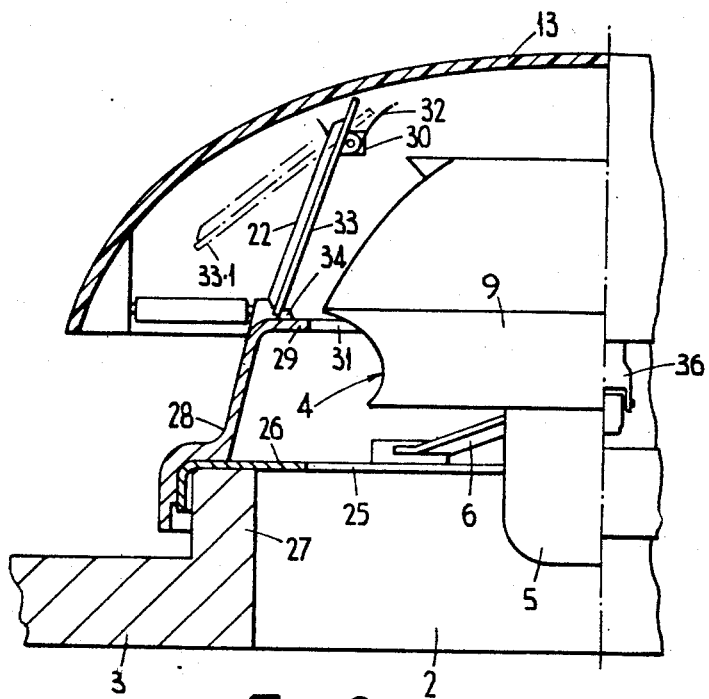
Fig. 9

March 18, 1969     B. B. DALY ET AL     3,433,145

IMPELLERS, ESPECIALLY FOR VENTILATORS

Filed March 3, 1967     Sheet 4 of 4

INVENTORS
BRIAN BOWMAN DALY
ALEC GERARD JAMES BAKER
JOSEPH PERCIVAL ANDERSON

ATTORNEYS

United States Patent Office 3,433,145
Patented Mar. 18, 1969

3,433,145
IMPELLERS, ESPECIALLY FOR VENTILATORS
Brian Bowman Daly, London, and Alec Gerard James Baker and Joseph Percival Anderson, Colchester, England, assignors to Woods of Colchester Limited, Colchester, England, a British company
Filed Mar. 3, 1967, Ser. No. 620,430
Claims priority, application Great Britain, Mar. 4, 1966, 9,561/66
U.S. Cl. 98—43                8 Claims
Int. Cl. F24f 7/06, 13/06; F04d 25/08

ABSTRACT OF THE DISCLOSURE

An impeller of the mixed flow type for gaseous fluids, especially suitable for use in a ventilator, comprising an inlet shroud, blades and back-plate so arranged as to give a particularly advantageous performance throughout the operating range of the impeller from maximum to minimum fluid flow.

---

This invention relates to impellers for producing movement of a gaseous fluid, for example air, and also to apparatus incorporating such impellers, for example ventilators, that is to say ventilators of the kind in which the impeller, usually electrically-driven, is mounted in an opening in the roof or wall of a building for expelling air or fumes from the building.

An object of the invention is to provide a form of impeller which is especially suitable for use in ventilating apparatus of this kind.

According to the invention an impeller for producing movement of a gaseous fluid comprises an annular shroud at the inlet end, the outlet of which shroud is outwardly flared, a dished back-plate coaxial with the shroud and having its convex surface directed towards but spaced from the flared outlet side of the shroud, and a plurality of impeller blades, extending generally outwards between the back-plate and the shroud, and having their inner and outer edges contacting the outer surface of the back-plate and inner surface of the shroud over a substantial part of the axial depth of the back-plate and shroud, with the blade surfaces so arranged as to provide an appreciable dynamic pressure rise due to the flow across the blades, after the fashion of an axial flow fan, in addition to an appreciable dynamic pressure rise resulting from radial flow, each blade being formed with a backward camber, having the trailing edge portion curved backwards to a relatively small discharge angle adjacent the back-plate, which curvature decreases towards the shroud to provide a relatively larger discharge angle in the vicinity of the shroud, and the direction of the blades at the leading edge being such as to provide a range of incidence angles giving a substantially smooth flow of said gaseous fluid over the blade surfaces throughout the normal operating range of fan from maximum to minimum fluid flow.

In the region of maximum curvature of the blades the discharge angle preferably lies between 0 and 20°, whilst at the shroud the discharge angle is preferably at least 60°.

We have found that the more nearly radial discharge angle of the blades at the shroud induces the gaseous fluid to flow without any significant degree of separation around the flared surface of the shroud, which contributes to a high volume flow at low external pressures, giving an almost straight pressure/volume characteristic which exhibits little or no "stall" or depressions, such as are associated with flow separation and increased noise with many known types of impellers.

By suitably shaping the blades to give an appropriate relationship between the dynamic pressure rise produced as a result of the axial flow and that due to radial flow throughout the range of operation of the impeller, a gradually falling horsepower/volume characteristic is obtained over substantially the whole operating range which ensures that the rated horsepower is utilised at all pressures.

The angle of incidence of the leading edges of the impeller blades, measured from a plane normal to the impeller axis is preferably of the order of 30°, this giving a satisfactory range of incidence angles for ensuring a substantially smooth flow over the blade surfaces throughout the range of operation of the impeller, from maximum to minimum air flow.

One or more slots may be provided, if required, in the part of each impeller blade adjoining the conjunction of the blade and the outwardly flared surface of the impeller shroud for reducing the horsepower absorbed by the impeller as the flow of gaseous fluid approaches zero by permitting some of the boundary layer air on the pressure surface of the blade adjacent the blade/shroud conjunction to leak through to the suction side of the blade and thereby improve the aerodynamic stability of the rearward portion of the impeller blade adjacent to the shroud.

The inlet side of the impeller shroud preferably extends beyond the impeller blades in an axial direction and is also flared outwards. This has the advantage that the gaseous fluid is prevented from being drawn radially inwards in the immediate vicinity of the blades and adversely affecting the smooth flow over the shroud and blade surfaces, as could occur for example in cases where a separate stationary flared shroud is employed at the impeller inlet, due to leakage of gas through the gap between the stationary and rotating shrouds, especially as the pressure across the impeller increases and the volume of gas passing through the impeller is reduced.

An impeller in accordance with the invention may be used with advantage in a ventilator designed to be mounted in an opening of a roof or wall for expelling air or fumes from a building. The ventilator may, for example, be constructed in such a way that the air or fumes driven from the opening in the roof or wall by the impeller are subsequently deflected and discharged backwards towards the roof or wall by a protective cowl or skirt which overhangs the opening on the exit side, or possibly the ventilator may include a shroud surrounding the exit side of the opening and designed to deflect the air or fumes back into the original direction in which it entered the impeller. In either case the ventilator can be designed with a shallow contour leading to an unobtrusive appearance.

Shutters may also be provided for preventing a backflow of air through the impeller when the ventilator is not operating, or is working against high external pressures.

In the case of a ventilator provided externally with a protective cowl or skirt the shutter vanes are preferably so shaped and positioned as to assist in providing an efficient deflection of the air stream beneath the edge of the skirt or cowl with the minimum of eddying. If necessary the shutter vanes may be smoothly curved to ensure a gradual deflection of the air flow in the required direction.

The shutter system conveniently comprises a plurality of single-vane shutters disposed around the ventilator outlet in the form of a regular polygon, for example a square.

Preferably also the shutter vanes are so disposed that when the ventilator is operating air passes over both sides of the vanes, the vanes then acting as mid-vane shutters and being held out of contact with any part of the surrounding structure, thereby eliminating noise generated by impact of the vanes on adjacent parts of the ventilator.

The skirt or cowl is conveniently formed of a moulded plastic material, possibly with fibrous or metal reinforcements for enabling the thickness of the plastic material to be reduced whilst still maintaining a relatively rigid structure.

Preferably also the impeller, and also the shutter vanes, where provided, are formed of moulded plastic, with fibrous reinforcement if required, the impeller conveniently being fabricated in suitably shaped sections secured together in any suitable manner.

The maximum diameter of the back-plate of the impeller is conveniently less than the minimum internal diameter of the shroud, giving the advantage of enabling both components to be compression moulded simultaneously in a common die, in which case the impeller blades will be formed separately and subsequently secured to the shroud and back-plate to hold them in the required spaced relationship.

The invention will be further explained by describing, by way of example, with reference to FIGURES 1 to 15 of the accompanying schematic drawings two roof ventilators incorporating an impeller in accordance with the invention, and some modifications thereof.

In the drawings:

FIGURES 6 and 7 illustrate the form of two operating characteristics of the impeller;

FIGURE 8 represents part of a slightly modified form of impeller;

FIGURES 9 and 10 represent a diagrammatic elevation and plan view of the second ventilator;

Figure 1:
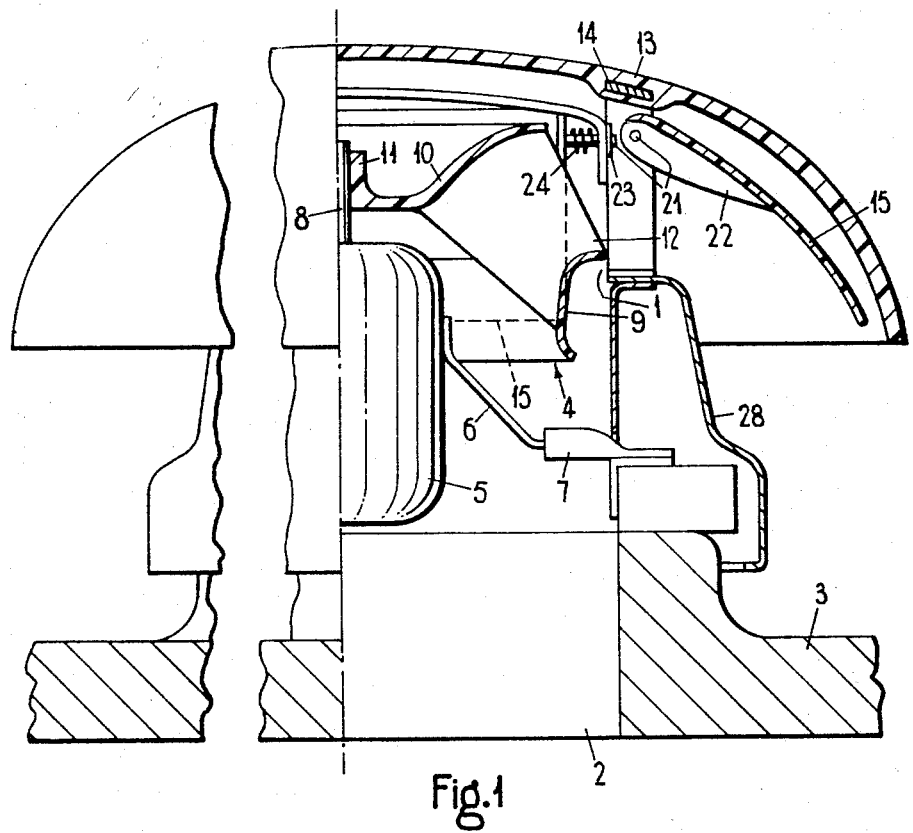
FIGURE 1 represents in diagrammatic form a vertical section through the first ventilator.
Figure 2:
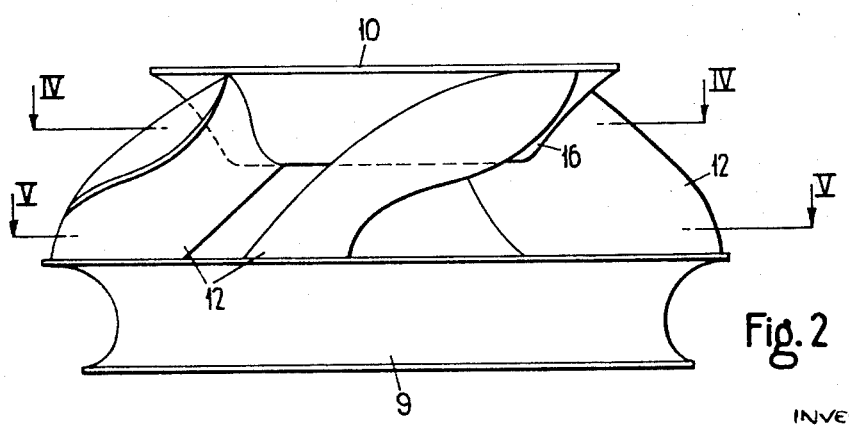
FIGURES 2 and 3 represent an elevation and an underneath view respectively of the impeller employed in the ventilator, one of the impeller blades being omitted from FIGURE 3.
Figure 3:
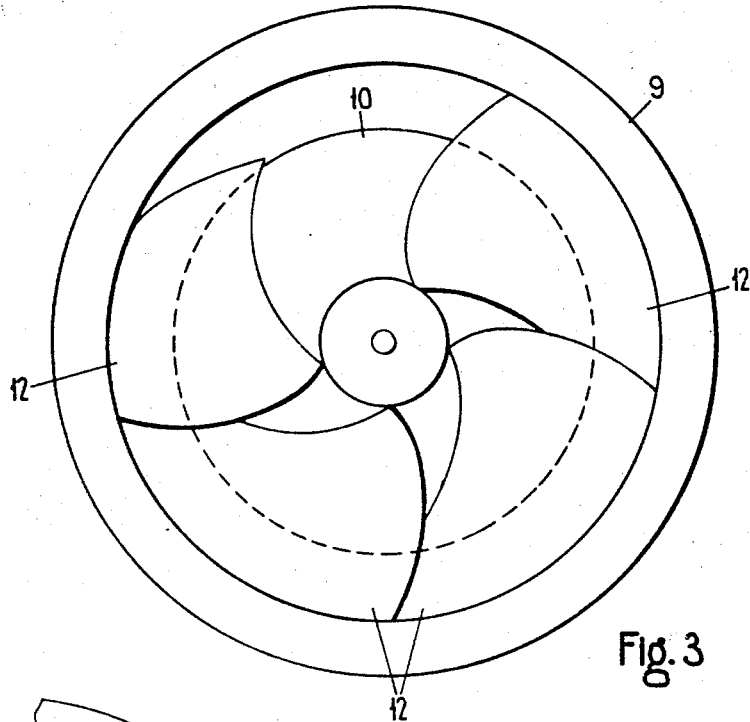

Referring first to FIGURE 1, the ventilator shown therein is designed to be mounted within a circular opening 1 formed at the upper end of a duct 28 supported over an opening 2 in the roof 3 of a building, and incorporates an impeller 4 arranged to be driven in use of the ventilator by an electric motor 5.

The motor 5 is mounted vertically by means of outwardly extending arms 6 which are secured at their outer ends to appropriately positioned brackets 7, these brackets incorporating a resilient mounting which mechanically isolates the motor/impeller unit from the remainder of the structure, the impeller 4 being mounted on the upwardly projecting shaft 8 of the motor.

The impeller, which is formed of moulded plastic material incorporating a fibrous reinforcement, for example glass fibre, comprises a shallow annular shroud 9 located coaxially wtihin the opening 1 with its upper end flared outwards and terminating at a slightly smaller diameter than the opening, a back-plate 10 of dished shape a short distance above the shroud and having a central boss 11 by which the impeller is secured to the shaft 8, and five impeller blades 12 extending between, and connecting, the shroud and the back-plate.

A dome-shaped weather cowl 13 also of plastic material and reinforced internally by metal bar reinforcement members 14, which may be partly enclosed within the plastic material as shown, and which also provide means for securing the cowl in position, is supported over the impeller with its skirt overhanging the top of the duct 28, so that air and/or fumes discharged from the duct by the impeller in use of the ventilator are deflected downwards through the annular gap between the external surface of the duct and the lip of the cowl. The cowl is approximately square in plan view and four pivotable shutter vanes 15 also of plastic material are supported within the cowl around the impeller for preventing backflow of air into the duct when the ventilator is inoperative or operating in conditions of high external pressure.

Referring now more particularly to FIGURES 2 to 5, which illustrate the form of impeller employed in the ventilator, the impeller blades 12, which have a backward camber, extend between the external surface of the dished side 16 of the back-plate 10 and the internal surface of the shroud and are inclined in both radial and transverse planes to provide a discharge having substantial components both axially and outwardly from the impeller, the arrangement ensuring that the rated horsepower of the motor is utilised at all pressures, involving a steadily falling input power from free air to closed discharge, and provides a high rate of flow at low pressure without any significant rise in power.

This is also due in part to the cowl limiting the formation of secondary air flows in the region above the back-plate.

Figure 4:
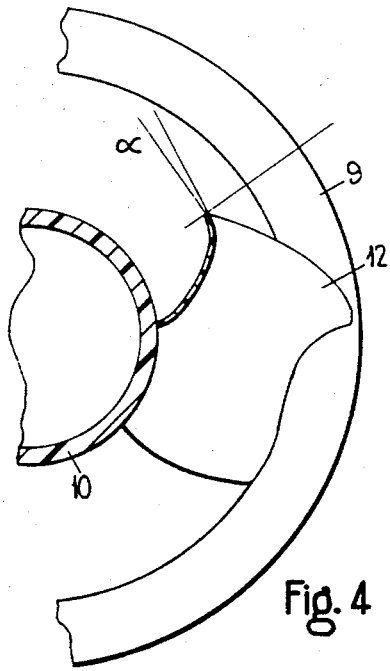
FIGURES 4 and 5 represent plan sections of parts of the impeller in the planes represented by the lines IV and V of FIGURE 2.
Figure 5:
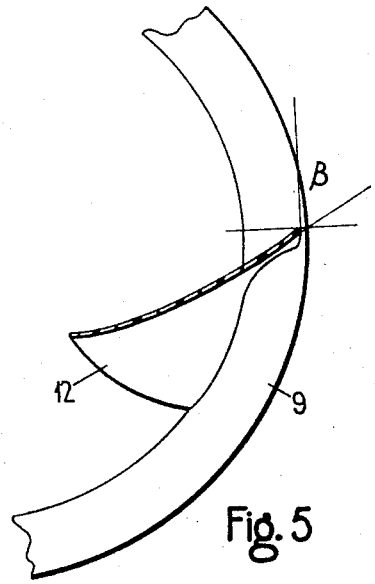

The trailing edge portion of each impeller blade is curved backwards to a relatively small discharge angle $\gamma$, for example of the order of 15°, in the region of the back-plate 10 as shown in FIGURE 4, this curvature decreasing towards the shroud 9 to provide a more nearly radial discharge angle $\beta$, for example of the order of 65°, at the shroud as shown in FIGURE 5. The latter feature ensures that air is induced to flow around the flared surface of the shroud 9 and we have found that by this means together with the increased curvature of the trailing edge of the blades away from the shroud an almost straight pressure/volume characteristic is obtained together with a gradually falling horsepower/volume characteristic for example as shown in FIGURES 6 and 7. The angle of incidence of the cambered leading edge of the impeller blades is approximately 30° measured in a plane normal to the impeller axis and this results in a substantially smooth air flow over the blade surfaces over substantially the whole operating range of the impeller, and a quiet and efficient operation of the ventillator is thereby achieved at all pressures.

In some cases improved aerodynamic stability of the impeller may be achieved by providing one or more slots in the blades at the conjunction of the blades and the flared portion of the impeller shroud as shown at 20 in FIGURE 8, the slots providing a reduction in the horsepower absorbed by the impeller as the air flow approaches zero, by permitting some of the boundary layer air on the pressure surface of the blade adjacent to the blade/shroud junction to leak through to the suction side of the blade.

By fabricating the cowl, shutter vanes and impeller in plastic materials, a ventilator having a high resistance to corrosion is obtained.

Referring again to FIGURE 1 the four shutter vanes 15 are of smoothly curved shape in vertical planes with integrally moulded strengthening ribs along the direction of air-flow, and are pivotably supported at the top by rods 21 extending through end walls 22 projecting downwards from the sides of the vanes and held at their ends in metal mounting brackets 23, the vanes being held in the closed position by springs 24 assisted by gravity when the ventilator is inoperative, whilst being sufficiently light to permit the downward deflection of the airstream leaving the impeller when the ventilator is operating to hold the shutters open to an extent depending upon the external pressure and the speed of rotation of the impeller. When the shutters are open, air from the impeller is permitted to pass between their upper surfaces and the cowl in addition to that which passes beneath the shutters, the shutters thereby acting as mid-vanes which are held out of contact with the adjacent parts of the ventilator structure by the air-flow, therefore eliminating shutter noise during operation of the ventilator.

Although the mounting arrangements for the ventilator which have been illustrated are designed for securing the ventilator to a roof curb surrounding the opening in the roof, it will be appreciated that the invention can also be employed with other forms of mounting arrangements depending upon the particular form of roof on which the ventilator is required to be used.

Figure 10:
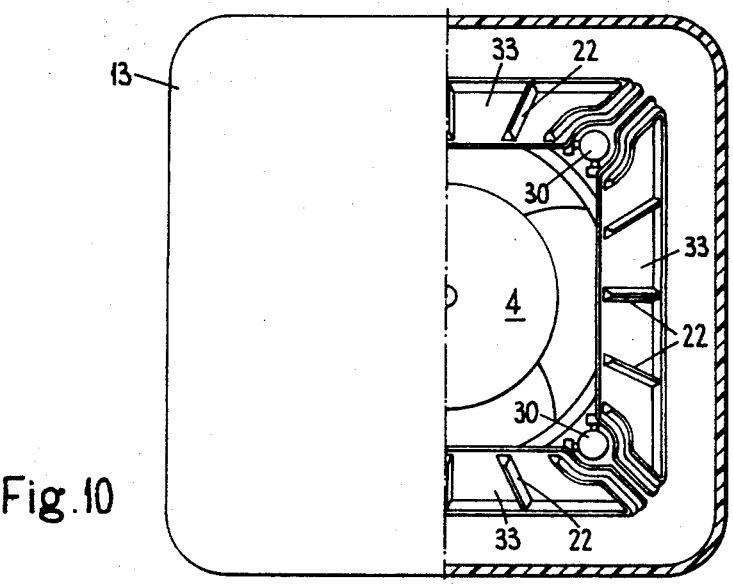

The second roof ventilator, which is illustrated in diagrammatic form in FIGURES 9 and 10, has an impeller 4 similar to that of the ventilator previously described, this being similarly mounted for rotation on the upwardly projecting shaft of an electric motor 5 supported within a circular aperture 25 of a metal plate 26 by outwardly extending arms 6 fixed to the plate at their outer ends, with suitable resilient mountings. The plate 26 has a downturned rim at its periphery shown fitted over a roof curb 27 surrounding an opening 2 in the roof 3 of a building. Seated on this plate in a shouldered duct 28 of plastic material formed wtih an inwardly-directed flange 29 surrounding a circular opening 31 at its upper end, the opening being of slightly greater diameter than the impeller shroud 9 and the impeller being supported with flared upper rim of the shroud just above the flange 29 as shown.

A moulded plastic cowl 13, which is approximately square in plan view, is supported over the impeller and is provided with internal projections 32 on which are seated bearing members 30 to which four plastic shutter vanes 33 are pivotably mounted. These vanes are disposed around the sides of a square, their lower ends being biassed towards a rib 34 on the upper surface of the flange 29 by springs (not shown) assisted by gravity, and against which the vanes rest in the inoperative condition of the ventilator. The vanes are in this case of planar form similarly provided on the rear surface with strengthening ribs 22.

When the ventilator is in use the impeller provides a discharge of the same form as that produced by the impeller of the ventilator first described, the air-flow holding the shutter vanes open as indicated by the broken line 33.1 the vanes assisting in deflecting the air downwards beneath the skirt of the cowl as in the previously described ventilator, the air similarly passing between the shutters and the cowl and thereby preventing impact of the vanes on the ventilator during operation of the ventilator and eliminating shutter noise.

By arranging that the diameter of the openings 1, 31 in each of the two ventilators above described, is slightly greater than the maximum diameter of the impeller shroud 9, servicing is facilitated since the impeller and motor unit can be removed from the ventilator either from above or from below.

Figure 11:
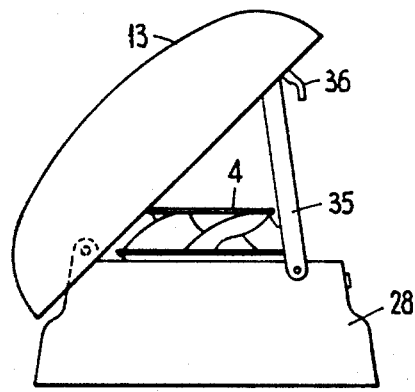
FIGURE 11 represents a further view of the ventilator in diagrammatic form.

The cowl of the ventilator illustrated in FIGURES 9 and 10 is conveniently pivotably mounted on the duct 28 in order to enable it to be swung back when necessary as shown in FIGURE 11, a pair of stays 35 being provided for holding the cowl in the raised position and a spring-loaded catch 36 enabling the cowl to be locked in the operative position. The cowl of the ventilator illustrated in FIGURE 1 could also be pivotably mounted if desired.

Figure 12:
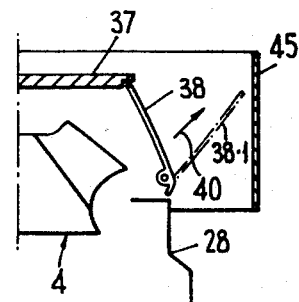
FIGURE 12 illustrates a modified construction of ventilator.

In a modification of either of the two ventilators above described the cowl 13 is dispensed with and replaced by a square top plate 37 having sides of length slightly larger than the diameter of the impeller back plate and an external weather baffle 45 as shown in FIGURE 12, the outlet of the ventilator on the four sides of the plate being closed in the inoperative condition of the ventilator by four shutter vanes 38 pivoted about horizontal axes near to their lower edges and biased towards the closed position by springs (not shown), the shutter vanes being of curved section in vertical planes and being arranged to deflect the outwardly directed airstream upwards in operation of the ventilator as indicated by the arrow 40. The shutter vanes may again be positioned so that when they are opened by the air stream in use of the ventilator some of the air passes beneath the vanes so as to hold them in a mid-vane position and thereby eliminate shutter noise as previously explained, the broken line 38.1 indicating the open position of the shutters. The shutters, in the closed position are so arranged as to provide a complete seal against rain ingress and backdraught.

Figures 13, 14, 15:
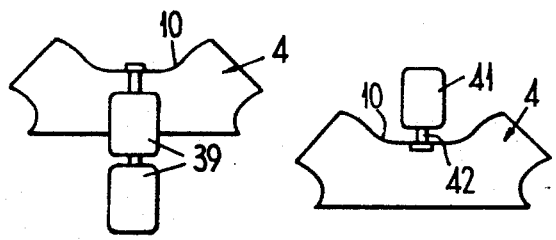
FIGURES 13 to 15 represent three further modifications.

In a further modification the impeller is fixed to the common shaft of two electric motors 39 as shown in FIGURE 13. During normal operation one of the motors is arranged to drive the impeller, the other idling and being arranged for use as a standby unit in the event of failure of the first motor.

By arranging the motor or motors on the input side of the impeller efficient cooling of the motor or motors by the air-flow is readily achieved.

Alternatively, however, one or two electric motors may be located on the dished side of the backplate 10, the motor or motors being removed from the normal airstream passing through the impeller. This is of advantage when the gaseous fluid passing through the impeller is contaminated or contains corrosive elements. FIGURE 14 shows one such motor 41 having the dished backplate 10 fixed to the downwardly directed motor shaft 42, although the impeller may be fixed to the common shaft of two motors located above the back-plate in a similar manner to the arrangement of FIGURE 13. However in an alternative arrangement utilizing two motors, one of which is designed to provide a standby unit, the motors may be arranged to drive the impeller indirectly for example by belts 43 as shown in FIGURE 15, the motors 44 being located in any convenient positions on two separate axes parallel to the impeller axis. Although the belts 43 have been shown above the motors 44 it will be appreciated that they could be disposed below the motors where this is more convenient.

It will be appreciated that ventilators similar to the cowled ventilators previously described or to the above modified forms can be adapted for mounting in an opening in a wall where this is required.

It will also be appreciated that impellers may also be used to advantage in units other than ventilators if desired, and in some cases such a unit might incorporate more than one impeller to increase the air flow. For example one or more such impellers may be used to produce a flow of air through a filter in an air conditioner unit. Where more than one impeller is employed and the impellers are disposed side by side, interference between the air flow issuing from adjacent impellers may be prevented by the use of suitably shaped air-deflecting screens located between them. For example each of the impellers may be mounted in an opening in a generally bell-shaped diaphragm having its mouth directed towards the required direction of air-flow, the sides of the diaphragm deflecting the radially directed component of air-flow in an axial direction and serving to prevent any interference with the output from adjacent impellers.

We claim:

1. An impeller for producing movement of a gaseous fluid comprising an annular shroud having an inlet and an outlet, the former merging smoothly into the latter which is outwardly flared, a dished back-plate coaxial with the shroud and having its convex surface directed towards but spaced from the flared outlet side of the shroud, and a relatively small number of impeller blades, extending generally outwards between the back-plate and the shroud, and having their inner and outer edges contacting the outer surface of the back-plate and inner surface of the shroud over a susbtantial part of the axial depth of the back-plate and shroud, with the blade surfaces so arranged as to provide an appreciably dynamic pressure rise due to the flow across the blades, in addition to an appreciable dynamic pressure rise resulting from radial flow, each blade being formed with a backward camber, having the trailing edge portion curved backwards to a relatively small discharge angle adjacent to the back-plate, which curvature decreases towards the shroud to provide a relatively larger discharge angle in the vicinity of the shroud, and the direction of the blades at the leading edge being such as to provide a range of incidence angles giving a substantially smooth flow of said gaseous fluid over the blade surfaces throughout the normal operating range of fan from maximum to minimum fluid flow.

2. An impeller according to claim 1, wherein in the region of maximum curvature of the blades, the discharge angle lies between 0 and 20°, whilst at the shroud the discharge angle is at least 60°.

3. An impeller according to claim 1, wherein the angle of incidence of the leading edges of the impeller blades, measured from a plane normal to the impeller axis is of the order of 30°.

4. An impeller according to claim 1, wherein the inlet side of the impeller shroud extends beyond the impeller blades in an axial direction and is also flared outwards.

5. An impeller according to claim 1, wherein the maximum diameter of the back-plate is less than the minimum internal diameter of the shroud.

6. A impeller according to claim 1 incorporated in a ventilator designed to be mounted in an opening in a roof or wall of a building for expelling air or fumes from the building, and at least one electric motor for driving the impeller, the ventilator having a duct designed to fit around the exterior of said opening and means for supporing the impeller at the outlet end of the duct with the inlet of the shroud lying within the duct and the flared outlet of the shroud lying outside the duct, and the duct being surmounted by a protective cowl or skirt which is coaxially supported over the outlet end of the duct for deflecting the discharged air or fumes backwards towards the roof or wall.

7. The combination of a ventilator and an impeller according to claim 6 incorporating a plurality of shutter vanes lying beneath said cowl or skirt around the outlet end of the duct for preventing a back-flow of air through the impeller when the ventilator is not operating or is working against high external pressures, the shutter vanes being openable under normal conditions of operation by air pressure produced by the impeller, and being smoothly curved to ensure a gradual deflection of the air stream beneath the edge of the skirt or cowl with the minimum of eddying.

8. The combination according to claim 7, wherein the shutter vanes are so disposed that when the ventilator is operating air passes over both sides of the vanes such that the vanes act as mid-vane shutters and their surfaces are held out of contact with any part of the surrounding structure.

References Cited
UNITED STATES PATENTS

| | | | |
|---|---|---|---|
| 1,167,152 | 1/1916 | Criqui | 230—134 |
| 1,240,949 | 9/1917 | Criqui | 230—134 |
| 2,469,125 | 5/1949 | Meisser | 230—134 |
| 2,548,465 | 4/1951 | Burdett et al. | 230—134 X |
| 2,551,004 | 5/1951 | Johnson | 98—43 |
| 2,882,077 | 4/1959 | Marsh | 230—134 X |
| 2,938,662 | 5/1960 | Eckert et al. | 230—134 |
| 3,212,425 | 10/1965 | Hazen et al. | 98—43 |

ROBERT A. O'LEARY, *Primary Examiner.*

WILLIAM E. WAYNER, *Assistant Examiner.*

U.S. Cl. X.R.

98—116; 230—134; 343—742, 792.5